US010423925B2

(12) United States Patent
Kwok

(10) Patent No.: US 10,423,925 B2
(45) Date of Patent: Sep. 24, 2019

(54) KIOSK CLUSTER

(71) Applicant: Ching Kwong Kwok, Hong Kong (HK)

(72) Inventor: Ching Kwong Kwok, Hong Kong (HK)

(*) Notice: Subject to any disclaimer, the term of this patent is extended or adjusted under 35 U.S.C. 154(b) by 0 days.

(21) Appl. No.: 16/003,135

(22) Filed: Jun. 8, 2018

(65) Prior Publication Data

US 2018/0293537 A1 Oct. 11, 2018

Related U.S. Application Data

(63) Continuation of application No. PCT/CN2018/080966, filed on Mar. 28, 2018.

(60) Provisional application No. 62/477,455, filed on Mar. 28, 2017.

(51) Int. Cl.
G06Q 10/08 (2012.01)
G06Q 20/18 (2012.01)
G07F 17/26 (2006.01)
G07F 9/02 (2006.01)

(52) U.S. Cl.
CPC .......... *G06Q 10/087* (2013.01); *G06Q 20/18* (2013.01); *G07F 9/023* (2013.01); *G07F 17/26* (2013.01)

(58) Field of Classification Search
CPC .............................. G06Q 20/18; G06Q 10/087
See application file for complete search history.

(56) References Cited

U.S. PATENT DOCUMENTS

| 7,942,315 B2* | 5/2011 | He | G06K 9/6226 235/375 |
| 8,078,349 B1* | 12/2011 | Prada Gomez | G05D 1/0061 701/1 |
| 2002/0069113 A1* | 6/2002 | Stern | G06Q 30/02 705/14.52 |
| 2004/0249711 A1* | 12/2004 | Walker | G06Q 10/06375 705/14.24 |
| 2005/0251456 A1* | 11/2005 | Perkowski | G06Q 30/02 705/26.62 |
| 2006/0028398 A1* | 2/2006 | Willmore | G06F 3/14 345/2.3 |
| 2006/0122881 A1* | 6/2006 | Walker | G06Q 10/087 705/14.13 |

(Continued)

FOREIGN PATENT DOCUMENTS

CN 106408346 A 2/2017

*Primary Examiner* — Peter Ludwig
*Assistant Examiner* — Michael Jared Walker

(57) ABSTRACT

A kiosk cluster may include a plurality of kiosks. Each kiosk may include an inventory shelf, image capturing device, sensors, display device, a processor and memory coupled with the processor. The processor identifies relevant inventory items matching with a current context determined via real time data analytics. The processor captures data associated with a user within the premises of the kiosk cluster via the image capturing device and the sensors. The data may include navigation path, facial expressions, features and actions or behaviors pertaining to one or more relevant inventory items. Further, the processor determines interest of the user in a relevant inventory item and future positions of the user on the navigation path. The processor displaces a kiosk holding the relevant inventory item in the direction of the future positions on the navigation path to be available for the purchase by the user.

20 Claims, 8 Drawing Sheets

(56) References Cited

U.S. PATENT DOCUMENTS

| | | | |
|---|---|---|---|
| 2007/0023511 A1* | 2/2007 | Smith | G06Q 10/087 235/385 |
| 2007/0026916 A1* | 2/2007 | Juds | G07F 7/005 463/1 |
| 2010/0234993 A1* | 9/2010 | Seelinger | B25J 9/1697 700/254 |
| 2012/0188177 A1* | 7/2012 | Kim | G06F 3/0485 345/173 |
| 2012/0265391 A1* | 10/2012 | Letsky | A01D 34/008 701/25 |
| 2013/0204948 A1* | 8/2013 | Zeyliger | G06F 9/44505 709/206 |
| 2014/0100769 A1* | 4/2014 | Wurman | G06Q 10/087 701/301 |
| 2014/0107835 A1* | 4/2014 | Biasi | B67D 1/0036 700/231 |
| 2014/0122702 A1* | 5/2014 | Jung | H04L 43/0876 709/224 |
| 2015/0016712 A1* | 1/2015 | Rhoads | G06K 9/00208 382/154 |
| 2015/0202770 A1* | 7/2015 | Patron | G05D 1/024 700/245 |
| 2015/0206188 A1* | 7/2015 | Tanigawa | G06Q 30/0261 705/14.58 |
| 2015/0249353 A1* | 9/2015 | Hamilton, IV | H02J 7/0045 320/114 |
| 2015/0363749 A1* | 12/2015 | Buscher | G06Q 10/20 705/305 |
| 2016/0012465 A1* | 1/2016 | Sharp | G06Q 20/18 705/14.17 |
| 2017/0023937 A1* | 1/2017 | Loianno | G08G 5/003 |
| 2017/0061405 A1* | 3/2017 | Bryant | G06Q 20/4014 |

* cited by examiner

KIOSK CLUSTER

CROSS-REFERENCE TO RELATED APPLICATIONS AND PRIORITY

The present application is a Continuation Application of PCT Application No. PCT/CN2018/080966 filed on Mar. 28, 2018, which claims priority from U.S. Provisional Patent Application No. 62/477,455 dated Mar. 28, 2017, the entirety of which is incorporated herein by reference.

TECHNICAL FIELD

The present application relates to the field of retail business and more specifically, automatic sale of original design products with the assistance of big data technology.

BACKGROUND

In the existing scenario, there has been proliferation in the marking campaigns pertaining to products being sold by the market leaders. With the advent of technology, the products are being commercialized and marketed via ecommerce platforms and social networking platforms. Therefore, big shopping malls are facing strong competition from these advanced marketing means. The advantage of these advanced marketing means is enabling selling a broad range of goods at competitive prices as well as creating more convenient consuming experience. Therefore, appeal of the shopping malls to customers is decreasing with their turnover. Further, the operation cost including rent, manpower, etc. is increasing day by day. Thus, traditional retail industry is under pressure to change. Small designers are also eager to find new marketing channels. But these designers are worried about the high cost of expanding their markets. Also, lack of knowledge of marketing may result in wrong targets and lead to low efficiency. And this problem can be perfectly solved by data mining and machine learning skills. On the other hand, customers are always excited about finding out novel products. They are tired of the normal products and hope to be exposed to different designing styles all around the world. Therefore, there exists lacunae of targeted customers in the shopping mall as-well-as there exists a problem of identifying relevant products of the consumer's interest thereby leading to overall selling time. There is a long-standing need of a kiosk cluster based on internet of things.

SUMMARY

This summary is provided to introduce concepts related to a kiosk cluster and the concepts are further described below in the detailed description. This summary is not intended to identify essential features of the claimed subject matter nor is it intended for use in determining or limiting the scope of the claimed subject matter.

In one embodiment, a kiosk cluster is disclosed. The kiosk cluster may include a plurality of kiosks. Each kiosk may further include an inventory shelf for holding a plurality of inventory items. The kiosk may further include one or more image capturing means capable of capturing a first set of data associated with one or more users. The first set of data comprises one or more of navigation path and facial expressions. The kiosk may further include one or more sensors capable of collecting environmental data and a second set of data associated with the one or more users. The second set of data may comprise one or more of features, and actions or behaviors of the one or more users pertaining to one or more inventory items. The kiosk cluster further may include one or more display means. The kiosk cluster may further include a processor and a memory coupled with the processor. The processor may be configured to execute programmed instructions stored in the memory. The processor may execute a programmed instruction for identifying a set of relevant inventory items matching with a current context determined via real time data analytics. The set of relevant inventory items may be virtually displayed on the one or more display means and may further be held on the inventory shelf. Further, the processor may execute a programmed instruction for capturing the first set of data and the second set of data associated with a user, detected within a predetermined distance of the kiosk cluster, and the environmental data via a combination of the one or more image capturing means and the one or more sensors. The processor may further execute a programmed instruction for determining interest of the said user in at least one relevant inventory item, and one or more user's future positions on the navigation path of the said user based upon a combination of first set of data and the second set of data captured corresponding to the said user. Further, the processor may execute a programmed instruction for displacing at least one kiosk holding the relevant inventory item in the direction of the one or more user's future positions determined on the navigation path of the said user such that the relevant inventory item is timely available for the purchase by the said user.

In another embodiment, a method executed on a kiosk cluster is disclosed. The method may include identifying, by a processor, a set of relevant inventory items matching with a current context determined via real time data analytics. The set of relevant inventory items may be virtually displayed on one or more display means of one or more kiosks in a kiosk cluster. The set of relevant inventory items may be further held on an inventory shelf of the one or more kiosks. The method may further include capturing, by the processor, a first set of data and a second set of data associated with a user, detected within a predetermined distance of the kiosk cluster, and environmental data via a combination of one or more image capturing means and one or more sensors of the kiosks. The first set of data may comprise one or more of navigation path and facial expressions. The second set of data may comprise one or more of features, and actions or behaviors of the one or more users pertaining to one or more relevant inventory items. The method may further include determining, by the processor, interest of the user in the relevant inventory item, and one or more user's future positions on the navigation path of the user based upon a combination of the first set of data and the second set of data captured corresponding to the said user. The method may further include displacing, by the processor, at least one kiosk holding the at least one relevant inventory item in the direction of user's future positions determined on the navigation path of the user such that the relevant inventory item may timely available for the purchase by the said user.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
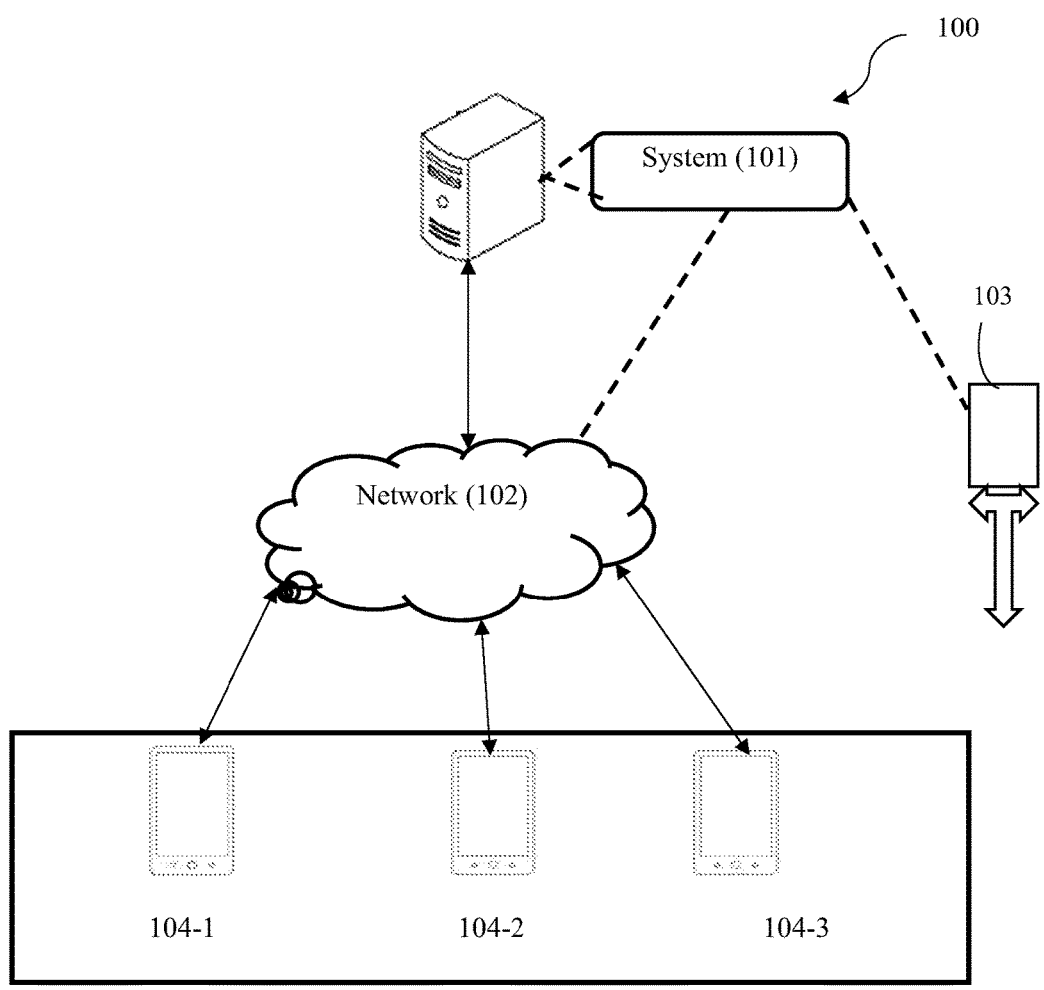
FIG. 1 illustrates a system implementation 101 for kiosk cluster, in accordance with an embodiment of the present application.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Some embodiments of this application, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any apparatuses, devices and methods similar or equivalent to those described herein can be used in the practice or testing of embodiments of the present application, the exemplary, apparatuses, devices and methods are now described. The disclosed embodiments are merely exemplary of the application, which may be embodied in various forms.

Various modifications to the embodiments will be readily apparent to those skilled in the art and the generic principles herein may be applied to other embodiments. However, one of ordinary skill in the art will readily recognize that the present application is not intended to be limited to the embodiments illustrated but is to be accorded the widest scope consistent with the principles and features described herein.

Detailed description of one or more embodiments of the present application is provided below along with accompanying figures that illustrate the principles with such embodiment. The present application is described in connection with such embodiments, but the present application is not limited to any embodiment. The present application encompasses numerous specific details are set forth in the following description in order to provide a thorough understanding of the present application. These details are provided for the purpose of example and the present application may be practiced according to the disclosure without some or all of these specific details. For the purpose of clarity, technical material that is known in the technical fields related to the present application has not been described in detail so that the present application is not unnecessarily obscured.

The present application provides a system for retail industry which serves as a moving shopping mall, called "kiosk cluster", located in a big shopping mall, car park space, office lobbies, event venue, cinema, private clubs or any public spaces. A big data prediction system may automatically determine theme/context of a predefined time period for the kiosk cluster and notify potentially interested owners all around the world to sell their design products/items (e.g. sunglasses, necklaces, small home decor, skin care, wine, tech gadgets) in the kiosk cluster. The products/items may be packaged and sent to the location where the kiosk cluster locates. Each owner may be assigned with a kiosk in the kiosk cluster. The owners of the products/items may manage their corresponding kiosks virtually and remotely (e.g. decorating the kiosks) through a mobile application. The kiosks in the kiosk cluster holding the respective products/items may be customized according to the owners' instructions from the mobile application. When the kiosk cluster starts to operate, parameters of the environment, the data and action of all objects (e.g. customers, staff) who enter the premises of the kiosk cluster may be recorded by sensors (e.g. cameras). A central control system of the kiosk cluster may acquire the objects' intention and predict their walking paths by analyzing the data. The kiosks will move to the best positions for the best convenience of the objects. After this term of kiosk cluster ends, the collected data will be used in market analysis which will be useful in determining the theme/context of the next time period or more business fields.

Referring now to FIG. 1, a system 101 for a kiosk cluster is illustrated in accordance with the present subject matter. In one implementation, the system 101 may be connected to multiple user devices 104 through a network 102. It may be understood that the system 101 may be accessed by multiple users through one or more user devices 104-1, 104-2,104-3, collectively referred to as user device 104 hereinafter, or user 104, or applications residing on the user device 104. In an embodiment, as illustrated in FIG. 1, the system 101 may accept information provided by multiple users 104-1,104-2,104-3 using the user device 104, to register the respective user with the system. In one embodiment, the multiple users 104 may include one or more owners of inventory items held by the kiosk cluster and one or more users interested in buying the inventory items.

In an embodiment, though the present subject matter is explained considering that the system 101 is implemented as a server, it may be understood that the system 101 may also be implemented in a variety of user devices, such as but are not limited to, a portable computer, a personal digital assistant, a handheld device, embedded hardware used only for this purpose, a mobile, a laptop computer, a desktop computer, a notebook, a workstation, a mainframe computer, and the like. In one implementation, the network 102 may be a wireless network, a wired network or a combination thereof. The network 102 can be accessed by the device using wired or wireless network connectivity means including updated communications technology. In one embodiment, the system 101 may be wirelessly connected to one or more kiosks 103 in the kiosk cluster.

Figure 2A:
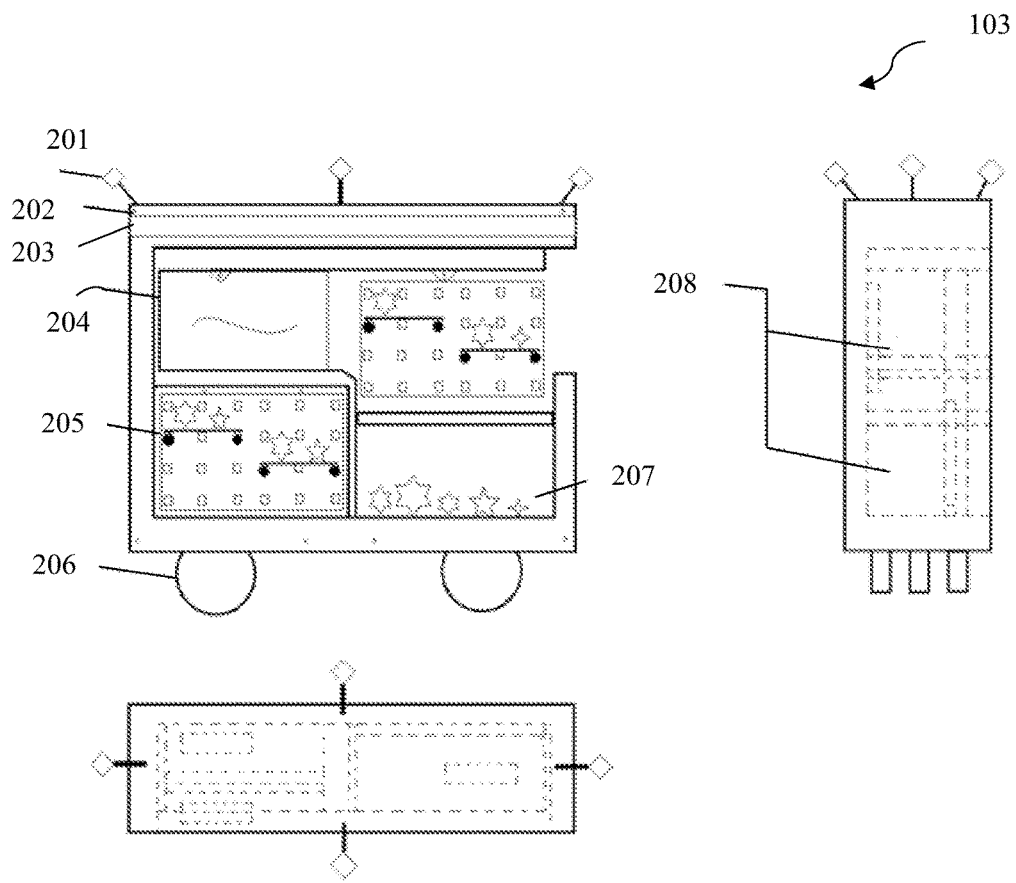
FIG. 2a illustrates front, left and top views of a kiosk 103 in the kiosk cluster, in accordance with an embodiment of the present application.

Referring now to FIG. 2a, front, left and top views of the kiosk 103 is illustrated in accordance with an embodiment of the present subject matter. In one embodiment, the kiosk 103 may include one or more image capturing means 201, one or more sensors 202, a LED banner 203, a screen 204, a display shelf 205, wheels 206, inventory shelf 207, and stock area 208. In one embodiment, the one or more image capturing means 201 may be a 360° streaming camera which can oversee the whole kiosk. In one embodiment, the kiosk 103 may include four 360° streaming cameras placed on the top of the kiosk 103. The image capturing means 201 may serve an important role of collecting data of individuals walking paths and facial features. The one or more sensors 202 may be installed around and inside the kiosk 103. The sensors 202 inside the kiosk 103 may collect data about the inventory items on the shelves. The sensors 202 around the kiosk 103 and the image capturing means 201 may be configured to collect data of environment (e.g. temperature, humidity), individuals' actions (e.g. making a call) and their moving paths. The sensors 202 inside the kiosk 103 may be configured to collect data of picked-up items, put-down items and the time individuals holding said items.

A real-time video analytics may be performed based upon the combined results from an inbuilt hand detection system and an inbuilt custom-object detection system (not shown) in the kiosk 103 using visual detection technology. The real-time video analytics may utilize the hand position in the custom-object recognition system for its conveniences of changing objects. However, this method may be constrained by dependencies such as the position of the objects and the environmental conditions for the video analytic system. In order to improve the accuracy and minimize the errors, two factors from the hand detection system and the custom-object detection system may be considered for the real-time video analysis. Each object/item from the shelf is pre-trained for the video analytic system before the said object/item is shelved. Moreover, the hand position may be compared with the detected objects, as a two-step verification of the objects recognized by the video object analytic system. It must be noted that different environments decrease the accuracy of object recognition using machine learning models. Further, implementing such object recognition in a mobile environment is even more challenging because light source, object position, and angle are at the three parameters that significantly decrease the accuracy and it takes time to change again.

In one embodiment, the present application enables in uploading hand detection data from the remote locations within the kiosk cluster 300 to the system 101 and automate the visual object training process with Auto Machine Learning Technology. Visual object detection may be performed based on the trained dataset. The automated data training system aims to minimize the errors during hand detection with the unprocessed data from different location. The system may utilize images with different environmental variables such as difference in lighting, background and image noises to improve the performance of hand recognition. In one embodiment, the data collected from the cameras 201 or sensors 202 associated with the mobile kiosks 103 within the kiosk cluster 300 may be transmitted to the system 101. The system 101 may include a machine learning module for training the data received from the kiosks 103. A processed training dataset obtained via the machine learning module may be transmitted to the kiosk 103. The inbuilt Hand Detection System (not shown) in the kiosk 103 may therefore have an improved dataset that can provide faster and more accurate results.

In one embodiment, the LED banner 203 may show the kiosk's name, product, and even the origin of the product. The screen 204 may be configured to enable the individuals to start a video chat with other individuals who may be owners of the inventory items. The display shelf 205 may be adjustable with stud and wooden board according to owner's configuration in the mobile application. The kiosk 103 may include three wheels 206 which provide mobility to the kiosk 103. In one embodiment, the kiosk 103 may include the inventory shelf 207 wherein the individuals may be able to pick the inventory items or products exhibited on the inventory shelf 207. In one embodiment, the stock area 208 may be behind the screen 204 and the display shelf 205 on the left part of the kiosk 103. The kiosk 103 may be a part of the kiosk cluster. The kiosk 103 may be managed by a central control system (not shown) including a processor (not shown) and a memory (not shown), wherein the processor may be configured to execute a plurality of programmed instructions stored in the memory. The kiosk 103 may be able to move to a proper position according to the instructions triggered from the central control system. In one embodiment, the kiosk 103 may include a rechargeable battery at the bottom.

In one exemplary embodiment, the kiosk 103 may be configured to work as mobile wine dispenser for wine tasting and buying online thereof. The central pegboard is changeable to a series of wine or liqueur dispenser. In the bottom part of kiosk 103, a chilling system and disposable glass dispenser for tasting may be added. Users may see and approach the kiosk 103. An inbuilt video analytic engine may be enabled to detect the gender and age. Age verification may be required by e-identification API and mobile phone member verification. Only verified customers will be served. The glass dispenser may dispense a glass to allow a user to pick the glass automatically. The user may select the wine and introduction will be displayed on the screen. A small portion of wine (e.g. 5 ml to 15 ml) may be dispensed to the glass to serve the user. A chilling system may be installed inside the car to keep all wines at prefect condition. A mobile notification may be transmitted to a wine maker or related party when the wine has been selected and dispensed. The wine maker or related party may have active video call to the kiosk 103 and talk to individual. In one embodiment, the individuals may be able to press customer service bottom that request for service. Wine may be changed by the time based on popularity and interaction with the wine maker in different locations based on tasting data, video data and sales data.

Figure 2B:
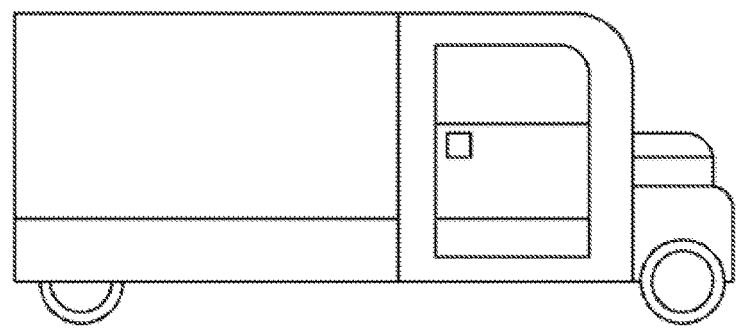
FIG. 2b illustrates the kiosk 103 in form of an autonomous or semi-autonomous vehicle (e.g. a car) capable of moving on streets or inside parking spaces, in accordance with an embodiment of the present application.

In one embodiment, the kiosk 103 may be allowed to move to different locations inside a space or on the road. The data may connect for video analytics like people counting. The data may be sent to a cloud and analyze to generate feedback to the kiosk 103 through network. Therefore, when multiple kiosks 103 in different locations in the same area, such as different floors, on the street car park are provided, the data may be combined based on map of the space. For example, 70% of customers are from main entrance, while 30% from car park. In one embodiment, as shown in FIG. 2b, the kiosk 103 may be in a form of an autonomous or a semi-autonomous vehicle (e.g. a car) so that the said kiosk 103 is adapted to act a moving shop cluster on a street, or inside a parking space. In one embodiment, for better accommodation of different types of products, providing additional flexibility to display products or information, and provide additional lighting for video analytics, which is high mobility and flexibility, different pegboard components options have been designed for flexible configurable of the kiosk 103.

In one embodiment, the kiosks 103 may collect vision data from the camera in different locations (not less than 10 pictures per second) from person outside 4 meters to persons who pick up products. The images may be manually tagged (e.g. Deep v, V neck, scoop, or Crew top) in different lighting environment, angles, etc., and then put into a neural network & transfer learning programs to train, evaluate and improve results. After the accuracy increase to 80%, the model may be deployed to use and keep optimize results by collecting labelled images.

Figure 3:
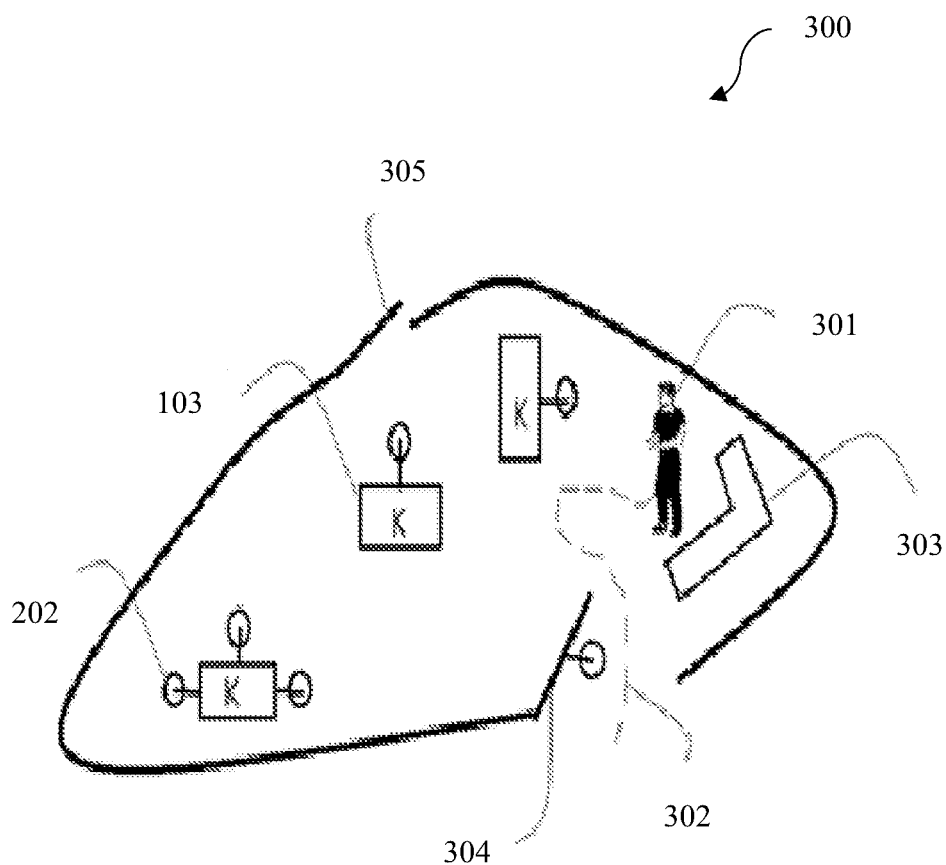
FIG. 3 illustrates components of a kiosk cluster 300, in accordance with an embodiment of the present application.
Figure 4:
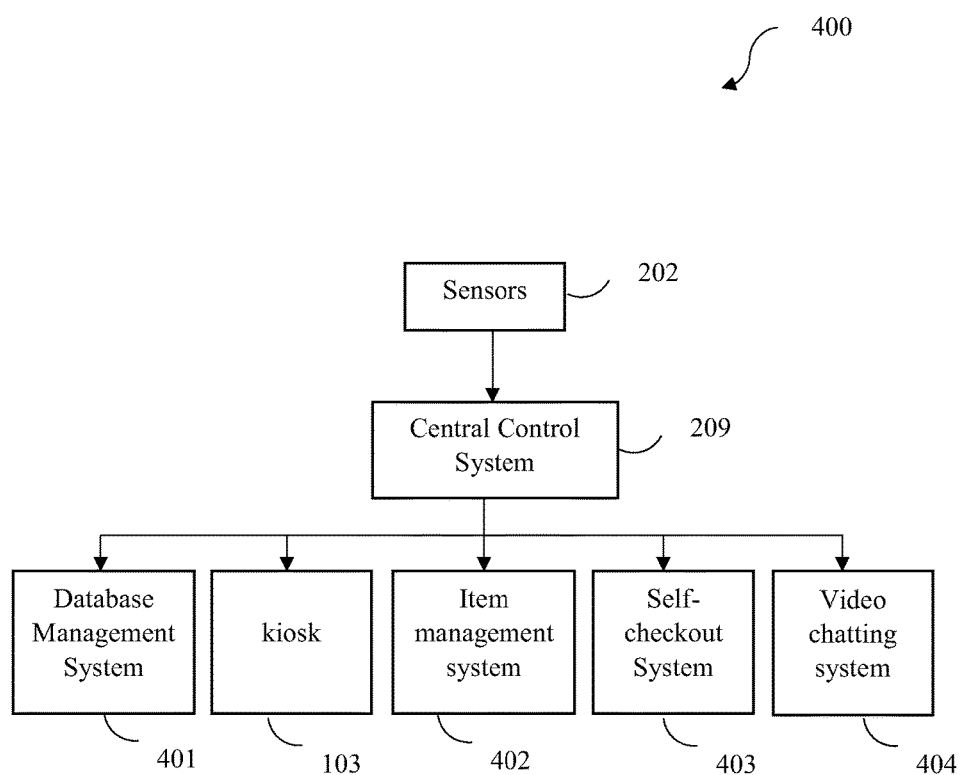
FIG. 4 illustrates a structure of the kiosk cluster system 400, in accordance with an embodiment of the present application.

Referring now to FIG. 3 and FIG. 4, components of the kiosk cluster 300 and the structure of the kiosk cluster system 400 is illustrated, in accordance with the present subject matter. The components of the kiosk cluster 300 may include an entrance 304, which may be a physical or sensor gate, a plurality of kiosks 103, a plurality of sensors 202 installed in the kiosks 103 and the entrance 304, and an exit 305. The kiosk cluster 300 may further include a leisure area 303 where music and entertainment facilities are provided. When an individual 301 (e.g. a customer) may enter the kiosk cluster 300, the individual's 301 navigation path 302 may be detected by the sensors 202, then recorded and analyzed by a central control system of the kiosk cluster 300. The kiosk cluster 300 may collect data from the sensors 202. In one embodiment, the said sensors 202 may collect the data of real time conditions of environment. When an individual 301 may enter the kiosk cluster 300, the individual's features may be fully recorded, wherein the features may include face, color, shoes, handbag, backpack, brand of shopping bags, etc. The face details may be blurred immediately for privacy. The data of the individual's actions are also collected, such as looking at a specific item, making a call and so on. The data may be useful in finding business values, such as what kinds of consumer the individual is, its consuming preference, what products it likes, etc. in one embodiment, the kiosk cluster 300 may collect data of the individual's navigation path and predicts one or more positions on the navigation path for the next few minutes. Further, based upon data analysis, the kiosk cluster 300 may conclude what kinds of products mostly appeal to it. The kiosks 103 then move to proper positions to make sure the individual/user can reach the products he/she is most interested in the most convenience.

As shown in FIG. 4, the kiosk cluster system 400 may include a database management system 401, an item management system 402, self-checkout system 403 and a video chatting system 404. The database management system 401 may store the data associated with the inventory items, the data associated with the users, the data associated with the owners of the inventory items. The data associated with the inventory items, the data associated with the owners may be captured from social media and internet websites. The item management system 402 may include information associated to designing or decorating the inventory items and managing the stocks of the inventory items. The self-checkout system 403 may automatically calculate the amount of money the user/purchaser requires to pay for buying the respective inventory items. The user/purchaser may pay through electronic payment methods prevalently adopted in the existing art. The video chatting system 404 may enable a video call between the users and the owners of the inventory items.

In one embodiment, the image capturing means 201 may be capable of capturing a first set of data associated with one or more users. The first set of data may comprise one or more of navigation path and facial expressions. The sensors 202 may be capable of collecting environmental data and a second set of data associated with the one or more users. The second set of data may comprise one or more of features, and actions or behaviors of the one or more users or individuals pertaining to one or more inventory items. The kiosk 103 may also comprise one or more display means. The kiosk 103 may further comprise a central control system 209. The central control system 209 may include a processor (not shown) and a memory (not shown) coupled with the processor. The processor may be configured to execute programmed instructions stored in the memory. The programmed instructions may comprise instructions for identifying a set of relevant inventory items matching with a current context determined via real time data analytics. The real time data analytics may be performed on the data stored in the database management system 401. The set of relevant inventory items may be virtually displayed on the one or more display means and may be further held on the inventory shelf 207. The programmed instructions may comprise instructions for capturing the first set of data and the second set of data associated with a user, detected within a predetermined distance of the kiosk cluster 300, and the environmental data via a combination of the one or more image capturing means 201 and the one or more sensors 202. The programmed instructions may further comprise instructions for determining interest of the said user in at least one relevant inventory item, and one or more user's future positions on the navigation path of the said user based upon a combination of first set of data and the second set of data captured corresponding to the said user. The programmed instructions may further comprise instructions for displacing at least one kiosk 103 holding the at least one relevant inventory item in the direction of the one or more user's future positions determined on the navigation path of the said user such that the at least one relevant inventory item is timely available for the purchase by the said user.

In one embodiment, the said features of the one or more users may comprise one or more of face of each user, one or more wearables of each user, and metadata associated with the one or more wearables. In one embodiment, the one or more wearables may comprise shoes, clothes, handbag, backpack, shopping bag. In one embodiment, the metadata associated with each wearable may comprise color, brand name, shape, and size. The actions or behaviors of the one or more users pertaining to one or more inventory items may comprise standing before a kiosk, browsing inventory details, picking an inventory item for a predefined time interval, dropping an inventory item after a predefined time interval, holding an inventory item for a predefined time interval, visualizing a particular inventory item in a particular manner for a predefined time interval, capturing photos and talking on a communication means. The environmental data captured may at least comprise temperature and humidity data.

In one embodiment, the processor may be configured to execute a programmed instruction for identifying one or more owners associated with the set of relevant inventory items matching with the current context, and wherein the one or more owners are identified based upon the data analytics. The processor may be further configured to execute a programmed instruction for enabling the one or more owners to control the virtual display of their corresponding relevant inventory items on the one or more display devices through a user device associated with the one or more owners. The processor may be configured to execute a programmed instruction for enabling the user device 104 of the one or more owners to communicate with a user device 104 of the one or more users. The processor may be configured to execute a programmed instruction for enabling the user to purchase the at least inventory item by processing the payment via electronic payment means as-soon-as the user is beyond the predefined distance from the kiosk cluster 300. The processor may be further configured to execute a programmed instruction for re-arranging positions of the one or more relevant inventory items virtually displayed on the one or more display means, and further re-arranging the positions the one or more relevant inventory items on the inventory shelf.

Figure 5:
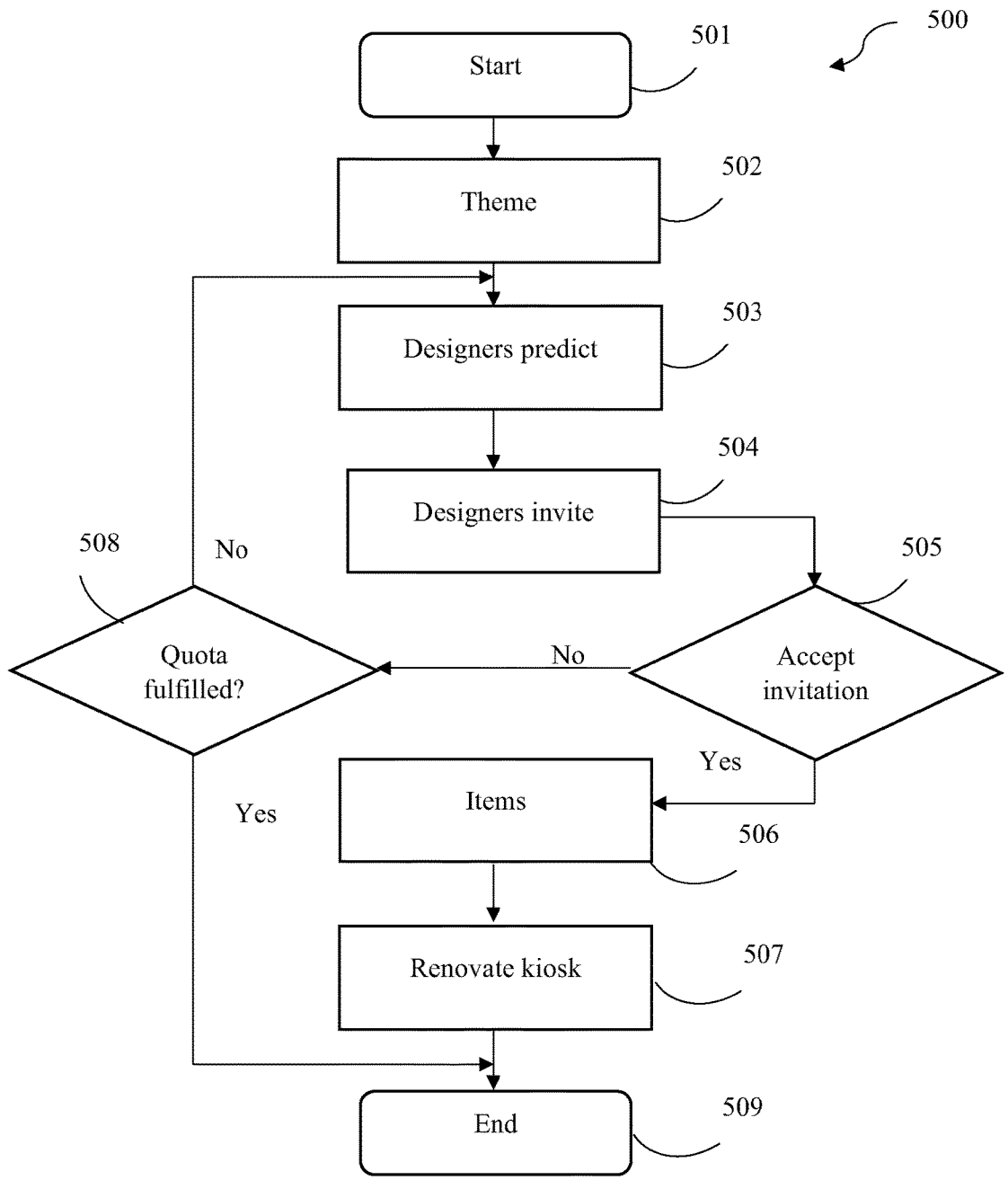
FIG. 5 illustrates a logical flowchart depicting a preparatory phase 500 of the kiosk cluster, in accordance with an embodiment of the present application.

Referring now to FIG. 5, a logical flowchart depicting a preparatory phase 500 of the kiosk cluster 300 is illustrated, in accordance with the present subject matter. In one embodiment, the source of the database may be made available from social media such as Pinterest, Instagram, Facebook.

At step 501, the system 101 may be initiated.

At step 502, the system 101 may determine a theme/context for the kiosk cluster 300 which most possibly wins business success based on the prediction of fashion trend and customers' preferences.

At step 503, the system 101 may make a prediction of the number of designers who may be interested in this theme/context and willing to sell their products in the kiosk cluster 300 and set quotas of participating designers.

At step 504, the system 101 may send invitation to the designers to sell products in the kiosk cluster 300.

At step 505, if a designer accepts the invitation, the process moves to the next step. Otherwise, at step 508 if there are still quotas for designers, the process goes back to Step 3. If not, the process ends.

At step 506 and 507, the designers may be enabled to virtually and remotely configure their kiosks 103 through a mobile application. Organizers of the kiosk cluster 300 renovate the kiosks and arrange stocks according to the request from the designers.

At step 509, the kiosk cluster 300 is ready and the preparatory phase ends.

Figure 6:
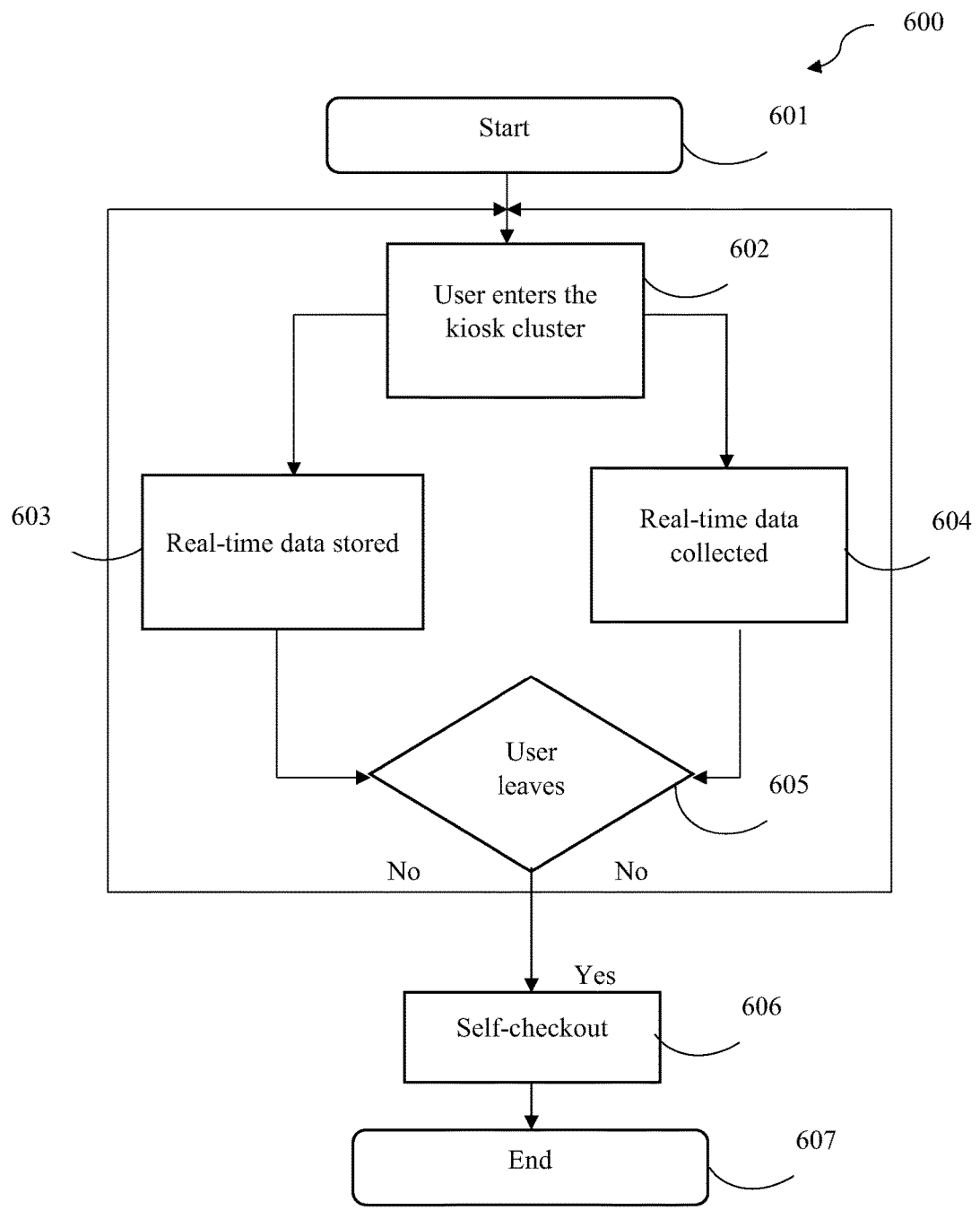
FIG. 6 illustrates a logical flowchart depicting a sales phase 600 of the kiosk cluster, in accordance with an embodiment of the present application.

Referring now to FIG. 6, a logical flowchart depicting a sales phase 600 of the kiosk cluster is illustrated, in accordance with an embodiment of the present subject matter. At step 601, the process is initiated when the individual enters the kiosk cluster 300.

At step 602, a user may enter the kiosk cluster 300 through a physical or a sensor gate. The user may just stand before a kiosk 103, browsing items or picking up an item in display shelves for more details. If the user is going to buy an item, the user may pick up one from the inventory shelf 207.

At step 603, real time data is stored in the database management system 401.

At step 604, real time data is collected.

When the user leaves the kiosk cluster 300 at step 605, at step 606 a self-check-out may be completed. The user may pay via one or more electronic payments methods and no cash may be required.

Figure 7:
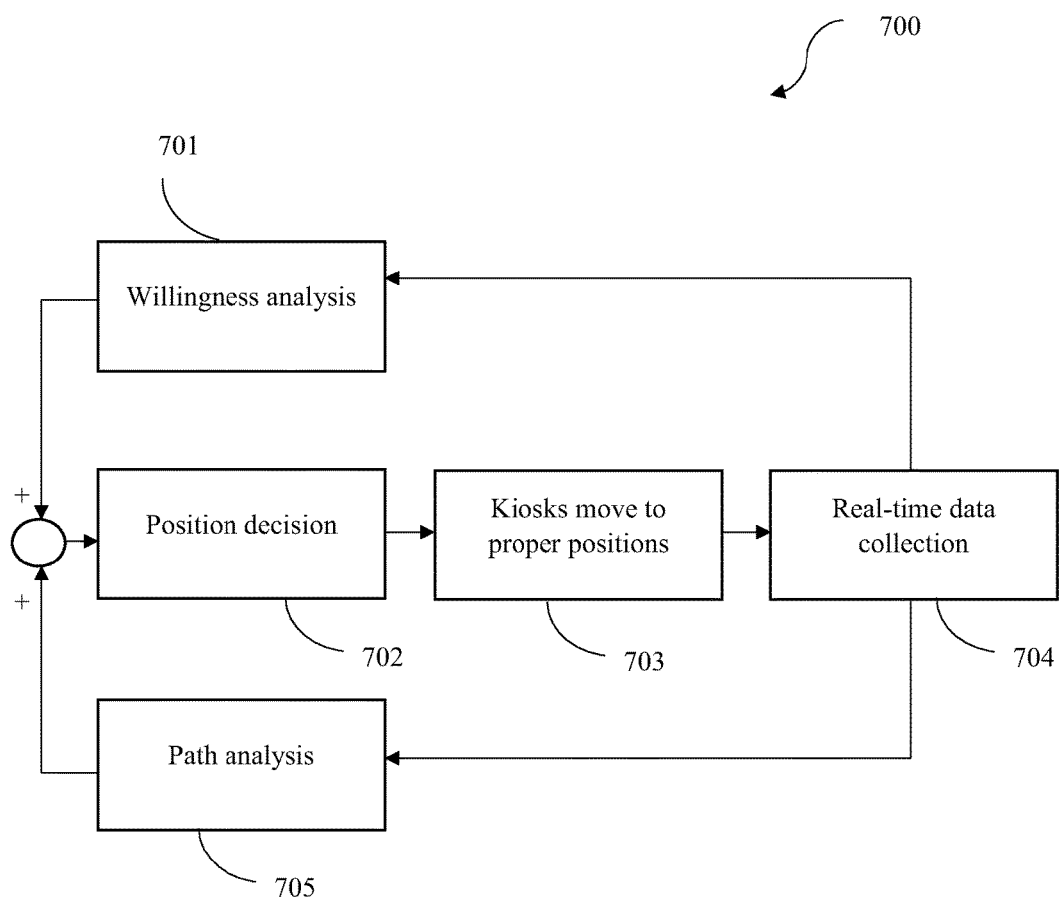
FIG. 7 illustrates a logical flowchart depicting steps implemented for collection of real time data 700, in accordance with an embodiment of the present application.

Referring now to FIG. 7, a logical flowchart depicting steps implemented for collection of real time data 700 is illustrated, in accordance with an embodiment of the present subject matter. The data may be collected all the time. The real-time data includes data outside and inside the kiosk cluster 300. At step 701, data may be collected related to the user's 301 navigation path and consuming actions. 360-degree cameras positioned on the top of each kiosk 103 may serve as an important role of collecting the data of walking path and facial features. The sensors 202 may serve as an important role of collecting the data of pick-up items and put-down items. Based on the collected data, the system may analyze the individual's willingness to buy a specific item and his next walking path.

Together with the results of willingness analysis 701 and path analysis 705, the system 101 may work out the new position 702 of every kiosk to make the individual reach the most expensive item he is willing to buy for most convenience. In this way, the kiosk cluster 300 can reach the biggest total sales.

At step 703, the kiosks 103 may automatically move to the proper positions in the system.

At step 704, the user may produce new real-time data after the positions of kiosks change. The process comes back to step 1 and circulates.

Figure 8:
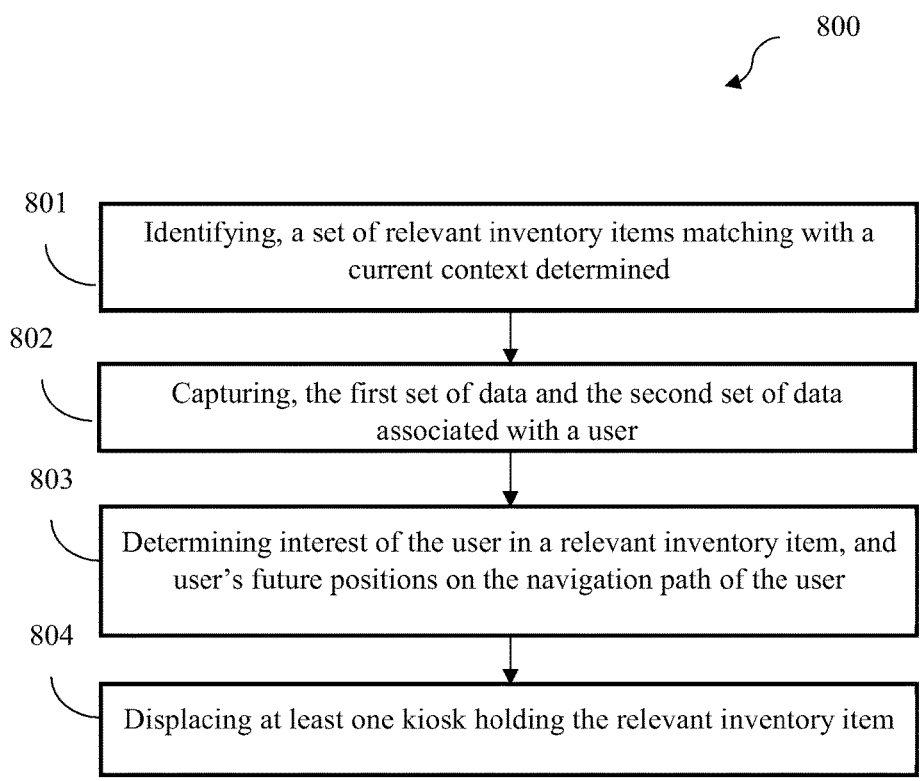
FIG. 8 illustrates a method 800 executed on a kiosk cluster, in accordance with an embodiment of the present application.

Now referring to FIG. 8, a method 800 executed on a kiosk cluster 300 is illustrated, in accordance with the present subject matter. The method 800 may be described in the general context of computer executable instructions. Generally, computer executable instructions can include routines, programs, objects, components, data structures, procedures, modules, functions, etc., that perform particular functions or implement particular abstract data types. The order in which the method 800 is described is not intended to be construed as a limitation, and any number of the described method blocks can be combined in any order to implement the method 800 or alternate methods. Additionally, individual blocks may be deleted from the method 7800 without departing from the spirit and scope of the subject matter described herein. Furthermore, the method can be implemented in any suitable hardware, software, firmware, or combination thereof. However, for ease of explanation, in the embodiments described below, the method 800 may be considered to be implemented in the above described kiosk cluster 300.

At step 801, the method 800 may include identifying, by a processor, a set of relevant inventory items matching with a current context determined via real time data analytics. The set of relevant inventory items may be virtually displayed on one or more display means of one or more kiosks 103 in the kiosk cluster 300. The set of relevant inventory items are further held on an inventory shelf 207 of the one or more kiosks 103.

At step 802, the method 800 may further include capturing, by the processor, a first set of data and a second set of data associated with a user or individual 301, detected within a predetermined distance of the kiosk cluster 300, and environmental data via a combination of image capturing means 201 and sensors 202 of the kiosks. The first set of data comprises one or more of navigation path and facial expressions. The second set of data comprises one or more of features, and actions or behaviors of the one or more users pertaining to one or more relevant inventory items.

At step 803, the method 800 may further include determining, by the processor, interest of the user in the relevant inventory item, and one or more user's future positions on the navigation path of the user based upon a combination of first set of data and the second set of data captured corresponding to the user.

At step 804, the method may further include displacing, by the processor, at least one kiosk holding the at least one relevant inventory item in the direction of user's future positions determined on the navigation path of the user. The relevant inventory item is timely available for the purchase by the said user.

Although implementations for a kiosk cluster and method implemented thereof have been described in language specific to structural features and/or methods, it is to be understood that the appended claims are not necessarily limited to the specific features or methods described. Rather, the specific features and methods are disclosed as examples of implementations for the kiosk cluster.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

What is claimed is:

1. A kiosk cluster, comprising:
    a plurality of kiosks, each kiosk further comprising
        an inventory shelf for holding a plurality of inventory items;
        one or more image capturing devices including a camera for capturing a first set of data associated with one or more users, wherein the first set of data comprises navigation path and facial expressions;
        one or more sensors capable of collecting environmental data and a second set of data associated with the one or more users, wherein second set of data comprises features, and actions or behaviors of the one or more users pertaining to one or more inventory items, wherein the features of the one or more users comprises face of each user, one or more wearables of each user, and metadata associated with the one or more wearables;
        one or more display devices;
        a processor; and
        a memory coupled with the processor, wherein the processor is configured to execute programmed instructions stored in the memory for
            identifying a set of relevant inventory items matching with a current context determined via real time data analytics, wherein the set of relevant inventory items are virtually displayed on the one or more display devices and are further held on the inventory shelf;
            capturing the first set of data and the second set of data associated with a user, detected within a predetermined distance of the kiosk cluster, and the environmental data via a combination of the one or more image capturing devices and the one or more sensors;
            determining interest of the said user in at least one relevant inventory item, and one or more user's future positions on navigation path of the said user based upon a combination of the first set of data and the second set of data captured corresponding to the said user; and
            displacing at least one kiosk holding the at least one relevant inventory item in a direction of the one or more user's future positions determined on the navigation path of the said user such that the at least one relevant inventory item is timely available for purchase by the said user.

2. The kiosk cluster of claim 1, wherein the one or more display devices comprises an LED banner, and a digital screen.

3. The kiosk cluster of claim 1, wherein each kiosk comprises one or more wheels for enabling movability of the said kiosk.

4. The kiosk cluster of claim 1, wherein the one or more image capturing devices are positioned on each kiosk and include one or more 360° streaming cameras.

5. The kiosk cluster of claim 1, wherein the one or more wearables comprises shoes, clothes, handbag, backpack, shopping bag, and wherein the metadata associated with each wearable comprises color, brand name, shape, and size, and wherein the environmental data at least comprises temperature and humidity data.

6. The kiosk cluster of claim 1, wherein the actions or behaviors of the one or more users pertaining to one or more inventory items comprises standing before each kiosk, browsing inventory details, picking an inventory item for a predefined time interval, dropping an inventory item after a predefined time interval, holding an inventory item for a predefined time interval, visualizing a particular inventory item in a particular manner for a predefined time interval, and capturing photos.

7. The kiosk cluster of claim 1, wherein the kiosk is either in a form of autonomous vehicle or a semi-autonomous vehicle adapted to act as a moving shop cluster on a street, or inside a parking space.

8. The kiosk cluster of claim 1, wherein the processor is further configured to execute a programmed instruction for identifying one or more owners associated with the set of relevant inventory items matching with the current context, and wherein the one or more owners are identified based upon the real time data analytics.

9. The kiosk cluster of claim 8, wherein the processor is further configured to execute a programmed instruction for enabling the one or more owners to control the virtual display of their corresponding relevant inventory items on the one or more display devices through a user device associated with the one or more owners.

10. The kiosk cluster of claim 9, wherein the processor is further configured to execute a programmed instruction for enabling the user device of the one or more owners to communicate with a user device of the one or more users.

11. The kiosk cluster of claim 1, wherein the processor is further configured to execute a programmed instruction for enabling the user to purchase at least inventory item by processing payment as-soon-as the user is beyond a predefined distance from the kiosk cluster.

12. The kiosk cluster of claim 1, wherein the processor is further configured to execute a programmed instruction for re-arranging positions of the set of relevant inventory items virtually displayed on the one or more display devices, and further re-arranging positions the set of relevant inventory items on the inventory shelf.

13. A method executed on a kiosk cluster, comprising:
    identifying, by a processor, a set of relevant inventory items matching with a current context determined via real time data analytics, wherein the set of relevant inventory items are virtually displayed on one or more display devices of one or more kiosks in a kiosk cluster, and wherein the set of relevant inventory items are further held on an inventory shelf of the one or more kiosks;
    capturing, by the processor, a first set of data and a second set of data associated with a user, detected within a predetermined distance of the kiosk cluster, and environmental data via a combination of one or more image capturing devices including a camera and one or more sensors of the one or more kiosks, wherein the first set of data comprises navigation path and facial expressions of the said user, and wherein the second set of data comprises features, and actions or behaviors of the said user pertaining to one or more relevant inventory items, wherein the features of the one or more users comprises face of each user, one or more wearables of each user, and metadata associated with the one or more wearables;

determining, by the processor, interest of the said user in at least one relevant inventory item, and one or more user's future positions on the navigation path of the said user based upon a combination of the first set of data and the second set of data captured corresponding to the said user; and displacing, by the processor, at least one kiosk holding the at least one relevant inventory item in a direction of the one or more user's future positions determined on the navigation path of the said user such that the at least one relevant inventory item is timely available for purchase by the said user.

14. The method of claim 13, wherein the one or more wearables comprises shoes, clothes, handbag, backpack, shopping bag, and wherein the metadata associated with each wearable comprises color, brand name, shape, and size.

15. The method of claim 13, wherein the actions or behaviors of the said user pertaining to one or more relevant inventory items comprises standing before a kiosk, browsing inventory details, picking an inventory item for a predefined time interval, dropping an inventory item after a predefined time interval, holding an inventory item for a predefined time interval, visualizing a particular inventory item in a particular manner for a predefined time interval, and capturing photos.

16. The method of claim 13, further comprising identifying, by the processor, one or more owners associated with the set of relevant inventory items matching with the current context, and wherein the one or more owners are identified based upon the data analytics.

17. The method of claim 16, further comprising enabling the one or more owners to control the virtual display of their corresponding relevant inventory items on the one or more display devices through a user device associated with the one or more owners.

18. The method of claim 17, further comprising enabling the user device of the one or more owners to communicate with a user device of the one or more users.

19. The method of claim 13, further comprising enabling the user to purchase at least inventory item by processing payment as-soon-as the user is beyond a predefined distance from the kiosk cluster.

20. The method of claim 13, further comprising re-arranging positions of the one or more relevant inventory items virtually displayed on the one or more display devices, and further re-arranging the positions the one or more relevant inventory items on the inventory shelf.

* * * * *